3,057,808
CARBON-NITROGEN POLYMERS AND PREPARATION THEREOF

William L. Fierce, Crystal Lake, and Walter J. Sandner, Carpentersville, Ill., assignors to The Pure Oil Company, Chicago, Ill., a corporation of Ohio
No Drawing. Filed Mar. 22, 1960, Ser. No. 16,635
8 Claims. (Cl. 260—1)

This invention relates to new and useful improvements in methods for preparing carbon-nitrogen polymers, and more particularly to an improved method in which a water-soluble cyanide salt is reacted with a water-soluble organic acid (such as acetic acid), in aqueous solution, at ambient temperatures to produce a black, solid polymer consisting essentially of carbon, nitrogen, and hydrogen.

Cyanogen, $(CN)_2$, is a well-known compound which is useful as an organic intermediate, and because of its high toxicity has found some use as a fumigant. In recent years, cyanogen has been evaluated as a rocket propellant and found to have only marginal value because of its toxicity and its extremely high combustion temperature (cyanogen and oxygen burn with a flame temperature several hundred degrees hotter than the oxy-acetylene flame). The construction materials presently used in rocket engines cannot handle the high temperature produced by a cyanogen flame and the toxicity of the compound is a substantial obstacle to its utilization. One possible solution to the problems of using cyanogen as a rocket fuel lies in converting it to a solid polymer. At the present time, solid propellants are widely used in both military and non-military rockets. It has been thought that solid polymers of cyanogen might be less toxic and have a sufficiently reduced flame temperature as to be useful as a rocket fuel.

Tricyanotriazine, which is also called cyanuric cyanide, can be considered to have the following structure:

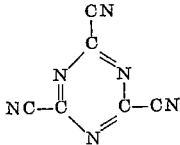

Because of its composition, containing nothing other than 3 mols of cyanogen, tricyanotriazine can be considered to be a trimer of cyanogen. However, in spite of this fact of constitution, tricyanotriazine has never been prepared by the condensation or polymerization of cyanogen. The nitrile (or cyanide) group in organic compounds is unsaturated in character and is highly reactive. Many of the reactions of the nitriles depend upon the ability of the carbon-nitrogen bond to add other groups. Examples of reactions which involve such addition are the hydrolysis of nitriles to carboxylic acids, and the formation of iminoethers by reaction with alcohols. The tendency of many nitriles to polymerize under the influence of certain reagents is another example of this reactivity at the carbon-nitrogen triple bond. Although this tendency is shown by all types of nitriles, the polymeric products differ in type depending upon the type of nitrile, and the conditions under which polymerization takes place. In numerous cases, nitriles polymerize to form trimeric polymerization products in which three nitrile groups combine to form the triazine ring:

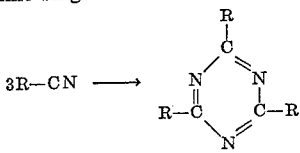

where R is any radical. Polymerization of this type takes place only when no CH or $CH_2$ group is attached to the cyanide group. Among the compounds which are known to polymerize to form the triazine ring are: cyanogen chloride, benzonitrile, trichloroacetonitrile, cyanic acid, and cyanamide. On the other hand, polymerization to form the triazine ring has never been reported for cyanogen, hydrogen cyanide, acrylonitrile, acetonitrile, or propionitrile. The polymerization to tricyanotriazine has been accomplished only by means of a multistep process involving: (1) dehydration of ethyl oxamate to ethyl cyanoformate, (2) polymerization of ethyl cyanoformate to triethylcarboxytriazine, (3) aminolysis of the triazine product to the corresponding amide, and (4) dehydration of the amide to tricyanotriazine. See E. Ott, Ber., 52, 660 (1919).

Cyanogen, however, is known to polymerize to form a material known as paracyanogen, a black, highly inert solid of high molecular weight. The properties of this solid are relatively well defined and numerous methods for its preparation have been reported. Paracyanogen is believed to be a long ribbon-shaped molecule, of indefinite length and molecular weight, of the general formula:

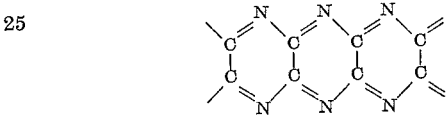

Paracyanogen is a dark, brownish-black solid material which is insoluble in water, organic solvents, and liquid cyanogen. It is insoluble in nitric acid but is partially soluble in strong caustic solution. It is also reported that paracyanogen dissolves in cold, concentrated sulfuric acid and can be recovered unchanged as a precipitate by dilution with water. It can be completely converted into cyanogen gas by heating to about 860° C. in a current of an inert gas such as nitrogen or helium. The molecular weight of paracyanogen is unknown and, in fact, indefinite, and so it is commonly designated as $(CN)_x$.

Many methods for the preparation of paracyanogen have been reported: V. Migrdichian, "The Chemistry of Organic Cyanogen Compounds," 1947, p. 362; H. E. Williams, "Cyanogen Compounds," 1948, p. 4; Beilstein's "Handbuch der Organischen Chemie," 2, 511 (1942), Second Supplement; and L. L. Bircumshaw, F. M. Taylor, and D. H. Whiffen, "J. Chem. Soc.," 1954, 931. Some of these methods for the preparation of paracyanogen are as follows:

(1) Paracyanogen forms when cyanogen is heated at atmospheric pressure at 310° C. or at lower temperatures under higher pressures. When the pressure is 300 atmospheres the temperature required is 220° C.

(2) Paracyanogen can be produced by the electrolysis of potassium cyanide solutions.

(3) Photopolymerization of cyanogen has been reported, as has polymerization initiated by alpha particles.

(4) Heating oxamide at 250°–300° C. in a sealed tube yields paracyanogen.

(5) Both cyanogen and paracyanogen are formed when either silver cyanide or mercuric cyanide is heated in a sealed tube above about 300° C.

In our copending application Serial No. 816,392, filed May 28, 1959, of which this application is a continuation in part, there is described a process for the production of carbon-nitrogen polymers which are derived from cyanogen or hydrogen cyanide by contact with a solution of a weak acid (other than hydrocyanic acid) in aqueous solution at ambient temperatures for an extended period of time. In that process, it was found that a solid, black polymer is obtained after storage of hydrogen cyanide or cyanogen over an aqueous acid solution for a period of time of the order of several days.

It is an object of this invention to provide a new and improved method for the preparation of carbon-nitrogen polymers using water-soluble cyanide salts as starting reactants.

Another object of this invention is to provide an improved carbon-nitrogen polymer which is produced from a water-soluble cyanide salt and which has properties similar to polymers which are obtained from cyanogen or hydrogen cyanide.

A feature of this invention is the provision of a new carbon-nitrogen polymer prepared by reaction of a water-soluble cyanide salt with a weak organic acid in aqueous solution at ambient temperatures, which polymer has properties very similar to polymers obtained from hydrogen cyanide or cyanogen.

Another feature of this invention is the provision of an improved method for the preparation of carbon-nitrogen polymers by reaction of a water-soluble cyanide salt with a weak acid in aqueous solution at ambient temperatures for an extended period of time.

Other objects and features of this invention will become apparent from time to time throughout the specification and claims as hereinafter related.

This invention is based upon our discovery that novel carbon-nitrogen polymers are obtained, which do not have the properties of either tricyanotriazine or paracyanogen, and which have properties very similar to the polymers produced in our copending application Serial No. 816,392, filed May 28, 1959, when a water-soluble cyanide salt is mixed with an aqueous solution of a weak, organic, water-soluble acid (such as acetic, tartaric, chloracetic, malonic dimethylmalonic, ethylmalonic, formic, glutaric, etc., acids) at a ratio of cyanide equivalent to acid in the range from about 0.5 to 3.0. When an aqueous solution of organic acid and cyanide salt is stored at ambient temperature (preferably room temperature) for an extended period of time, a solid black polymer is obtained which is neither tricyanotriazine, nor paracyanogen, and which is very similar in properties to the carbon-nitrogen polymers produced in our aforementioned copending patent application. This process appears to be independent of pressure and may be carried out at pressures varying from atmospheric or less to superatmospheric pressures ranging up to as much as 1000 atmospheres or more. This process proceeds satisfactorily at room temperature, but is operative at ambient temperatures which may vary in the range from zero to 100° C.

The following non-limiting examples are for the purpose of illustrating the scope of this invention and comparing it with the prior art and with the process described in our aforementioned copending application:

*Example I*

In the process described in our copending application, a carbon-nitrogen polymer was prepared from cyanogen as follows:

A glass vial of 220 ml. volume was charged with 15 g. sodium cyanide, 25 ml. water, 25 ml. glacial acetic acid, and 14.0 g. cyanogen. The vial was sealed and allowed to stand at room temperature, with occasional agitation, for 5 weeks. At the end of this time, the vial was opened and the volatile material was allowed to escape into a hood. A black solid precipitate was recovered, purified by extraction with boiling water, and dried. The product which was obtained amounted to 8.97 g. of a black, odorless solid. This solid was insoluble in all common solvents.

The formation of the black polymer is dependent upon the amount of water-soluble cyanide salt (e.g., sodium cyanide) present in the reaction mixture. No reaction occurs in the absence of sodium cyanide. Also, if sodium cyanide is present in only catalytic amounts (less than a 1:1 mol ratio of sodium cyanide to cyanogen), the cyanogen is hydrolyzed, rather than polymerized. This process is therefore dependent upon the presence of the water-soluble cyanide salt in a mol ratio of cyanide salt-to-cyanogen which is greater than 1:1.

The standard analytical laboratory techniques for analysis of nitrogen are inaccurate when applied to nitrogen-containing polymers such as paracyanogen, and it was therefore impossible to obtain a precise and exact analysis of the polymeric products. However, the black, solid polymer obtained in this experiment was analyzed for carbon, nitrogen, and hydrogen, and was subjected to thermal decomposition by heating at 850°–900° C. for a period of 2–3 hours. With common methods of analysis, composition of the polymer was: 35.9% carbon, 3.9% hydrogen, 37.3% nitrogen, and 22.9% unidentified residue. When the polymer was decomposed by heating to 850°–900° C. for 2–3 hours, there was left 10.7% of the polymer as a non-volatile residue. The volatile products of the decomposition contained 14.9% cyanogen, 22.2% hydrogen cyanide, and 52.2% of unidentified material, referred to the whole polymer. This polymer was also burned in oxygen and found to have a heat of combustion of 7030 B.t.u./lb. The solid polymers which were produced in this experiment are useful as a solid high-energy rocket fuel and are also useful as non-toxic solid sources for evolving cyanogen and/or hydrogen cyanide.

For comparison, paracyanogen was prepared by heating mercuric cyanide to 590° F. The black solid paracyanogen which was obtained analyzed: 36.6% carbon, 1.2% hydrogen, 43.0% nitrogen, and 19.2% unidentified residue. This paracyanogen was also decomposed by heating to 850°–900° C. for a period of 2–3 hours and the thermal decomposition products analyzed. The non-volatile residue consisted of only 1% of the weight of the paracyanogen. Unidentified volatile matter constituted 46.5% of the weight of paracyanogen, and there was obtained 44.3% cyanogen and 8.2% hydrogen cyanide. This paracyanogen was burned in oxygen and found to have a heat of combustion of 6860 B.t.u./lb. From these experiments, it is seen that the product which we have obtained is a polymer having properties which are markedly different from the paracyanogen which is obtained in accordance with classical procedures.

In carrying out our above-described process, the conditions of operation are not particularly critical. This process is operative over a wide range of pressures, from atmospheric pressure to as much as 1000 atmospheres, or higher. The process is operative over a wide range of temperatures, from as low as 0° to as high as 100° C., or higher. The reaction proceeds satisfactorily, however, at ambient temperatures, preferably room temperature. The only factor which appears to be critical in the process is the proportion of soluble cyanide salt, as previously described. The amount of water-soluble cyanide salt present must be in a molar excess over the cyanogen. However, there is no known upper limit to the amount of water-soluble cyanide salt which may be used in this process. Also, the reaction time is not critical. While the initial reaction was allowed to proceed for 5 weeks, such a long reaction time is not necessary because a large amount of black solid was observed to form during the first day of the reaction.

*Example II*

In another experiment, described in our aforementioned copending application, several glass vials were charged with reactants, sealed, and allowed to stand at room temperature for 60 days with occasional agitation. One vial was charged with 25 ml. glacial acetic acid, 25 ml. water, and 7.2 g. hydrogen cyanide. No polymeric product was obtained. A second vial was charged with 25 ml. glacial acetic acid, 25 ml. water, 5 g. sodium cyanide, and 6.3 g. hydrogen cyanide. At the end of the 60-day period, no product had formed. A third vial was charged with 25 ml. glacial acetic acid, 25 ml. water, 15 g. sodium cyanide, and 7.3 g. hydrogen cyanide. At the end of the reaction period, there was recovered 11.8 g. of a black solid material which was recovered by filtration, followed by water-washing and drying. This black solid was odorless and insoluble in all common solvents. The fourth vial was charged with 25 ml. glacial acetic acid, 25 ml. water, 30 g. sodium cyanide, and 7.1 g. hydrogen cyanide. At the end of the reaction period, there was recovered 9.4 g. of a black solid polymer which was recovered by filtration, followed by water washing and drying.

The solid polymers obtained from the third and fourth reaction vials were analyzed for carbon, hydrogen, and nitrogen content, and were also subjected to thermal decomposition at 850°–900° C. The polymer obtained from the third and fourth vials contained 34.5% carbon, 4.2% hydrogen, 35.7% nitrogen, and an unidentified residue of 25.6%. Thus, the polymer is seen to have a carbon, hydrogen, nitrogen, and residue content which corresponds closely to the cyanogen polymer obtained in Example I, but differs markedly from the composition of the paracyanogen obtained by pyrolysis of mercuric cyanide. As mentioned, the polymers obtained in Experiments 3 and 4 were subjected to thermal decomposition at 850°–900° C. The products of decomposition consisted of 10.7% cyanogen, 24.4% hydrogen cyanide, 12.3% non-volatile residue, and 52.6% unidentified volatile material, referred to the weight of whole polymer. Again, the decomposition products of this polymer correspond closely to the decomposition products obtained from the cyanogen polymer described in Example I, rather than the decomposition products of paracyanogen obtained from mercuric cyanide.

The polymer obtained in Experiments 3 and 4 had a heat of combustion of 8260 B.t.u./lb. and may be used as a solid rocket fuel. This polymer is also useful as a stable, solid, non-toxic source for cyanogen or hydrogen cyanide since both of these compounds are liberated from the polymer upon heating.

*Example III*

In this invention, we have found that it is possible to obtain carbon-nitrogen polymers which are substantially identical to those prepared in accordance with Examples I and II by reacting a water-soluble cyanide salt with a weak organic acid in aqueous solution. In this process, the ratio of cyanide equivalent-to-acid must be in the range from about 0.5 to 3.0. The reaction which occurs producing the carbon-nitrogen polymer takes place at ambient temperatures, preferably room temperature, although the temperature may vary from as low as 0° C. to as high as 100° C. The reaction time is not critical, although generally the maximum amount of product is obtained after about 7 days.

In one experiment, the glass vial was charged with 25 cc. water, 25 cc. glacial acetic acid, and 30 g. sodium cyanide. The vial was capped and mixed thoroughly and held for 8 days at room temperature. At the end of this period of time, the vial contained a soft, black solid with no separate liquid layer. The black solid was water-washed and dried to give 6.5 g. of a black, solid product. The dried product was analyzed by infra-red spectroscopy and found to have an infra-red spectrum which was substantially the same as the infra-red spectrum of the products obtained in Examples I and II. The product analyzes about 35% carbon, 4% hydrogen, 35% nitrogen, and an unidentified residue of about 26%. Upon thermal decomposition at 850°–900° C., this product yields about 11% cyanogen, 25% hydrogen cyanide, 12% non-volatile residue, and 53% unidentified volatile matter, referred to the weight of whole polymer. This product when burned in air or oxygen has a heat of combustion in excess of about 8000 B.t.u./lb. and may be used as a solid rocket fuel. This polymer is also useful as a stable, solid, non-toxic source for cyanogen and hydrogen cyanide, since both of these compounds are liberated from the polymer upon heating.

In another experiment, a glass vial was charged with 25 cc. water, 25 cc. glacial acetic acid, and 20 g. sodium cyanide. At the end of 9 days' storage, the vial was found to contain a hard, black solid and a small amount of liquid. The solid material was filtered, water-washed, and dried to give a black, solid product weighing 5.9 g. This product was analyzed by infra-red spectroscopy and found to have a spectrum substantially the same as the products produced in Examples I and II and in the first experiment of this example.

In still another experiment, a glass vial was charged with 25 cc. water, 25 cc. glacial acetic acid, and 10 g. sodium cyanide. The vial was stoppered and stored at room temperature for 9 days. At the end of this time, it was found that a brown-black solution had formed which was free of any solid residue. It would appear that the concentration of sodium cyanide in this vial was at a value just below the minimum required for production of the solid polymers of this invention.

We have found that in the production of a solid carbon-nitrogen polymer in accordance with this invention, it is necessary to use a ratio of cyanide equivalent-to-acid in the range from about 0.5 to 3.0. In carrying out this invention, other weak organic acids, such as formic, chloracetic, malonic, glutaric, etc., acids, may be substituted for glacial acetic acid. Similarly, other water-soluble alkali and alkaline earth metal cyanide salts, e.g., potassium cyanide, ammonium cyanide, magnesium cyanide, etc., may be substituted for sodium cyanide.

While we have described our invention fully and completely as required by the patent laws, with special emphasis upon several preferred embodiments of the invention, we wish it to be understood that within the scope of the appended claims, this invention may be practiced otherwise than as specifically described herein.

The embodiments of the invention in which an exclusive property or privilege is claimed are defined as follows:

1. A method of preparing carbon-nitrogen polymers which comprises reacting a water-soluble cyanide salt with a water-soluble organic acid selected from the group consisting of acetic acid, chloracetic acid, formic acid, malonic acid and glutaric acid, in aqueous solution, at a ratio of cyanide equivalent-to-acid in the range from about 0.5 to 3.0, at ambient temperature, for a time sufficient to effect the formation of a black, solid polymer, and recovering the polymer from said solution.

2. A method in accordance with claim 1 in which the reaction temperature is about 0°–100° C.

3. A method in accordance with claim 1 in which the acid used is acetic acid.

4. A method in accordance with claim 1 in which the cyanide salt is selected from the group consisting of alkali metal, alkaline earth metal, and ammonium cyanides.

5. A method in accordance with claim 1 in which the reaction time is in excess of about 7 days.

6. A method of preparing carbon-nitrogen polymers which comprises reacting acetic acid with sodium cyanide in aqueous solution at a mol ratio of sodium cyanide-to-acetic acid in the range from about 0.5 to 1.5, at a temperature of 0°–100° C., for a time sufficient to effect the formation of a black, solid polymer, and recovering the polymer from said solution.

7. A carbon-nitrogen polymer prepared in accordance with claim 1.

8. A carbon-nitrogen polymer prepared in accordance with claim 6.

No references cited.